No. 636,636. Patented Nov. 7, 1899.
O. J. COLE.
CHURN.
(Application filed Apr. 18, 1898.)
(No Model.)

Witnesses Orlando J. Cole, Inventor
By his Attorneys,

UNITED STATES PATENT OFFICE.

ORLANDO JAMES COLE, OF ARLINGTON, KENTUCKY.

CHURN.

SPECIFICATION forming part of Letters Patent No. 636,636, dated November 7, 1899.

Application filed April 18, 1898. Serial No. 678,051. (No model.)

*To all whom it may concern:*

Be it known that I, ORLANDO JAMES COLE, a citizen of the United States, residing at Arlington, in the county of Carlisle and State of Kentucky, have invented a new and useful Churn, of which the following is a specification.

My invention relates to churns, and particularly to the construction of a dasher and breaker for coöperative use in a churn-receptacle of the ordinary or any preferred construction; and the object in view is to provide a simple, compact, and efficient construction and arrangement of parts adapted for facilitating the separation and gathering of butter.

Further objects and advantages of this invention will appear in the following description, and the novel features thereof will be particularly pointed out in the appended claims.

Figure 1:
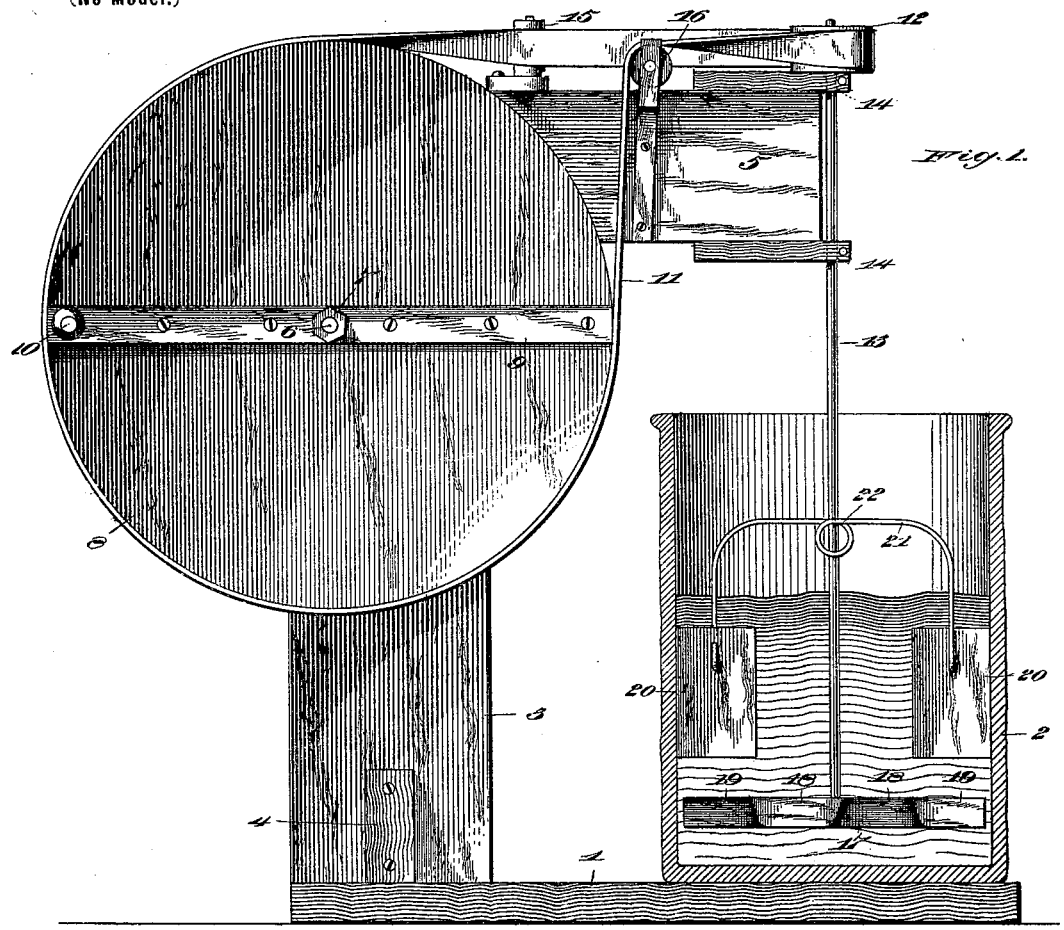
Figures 2, 3:
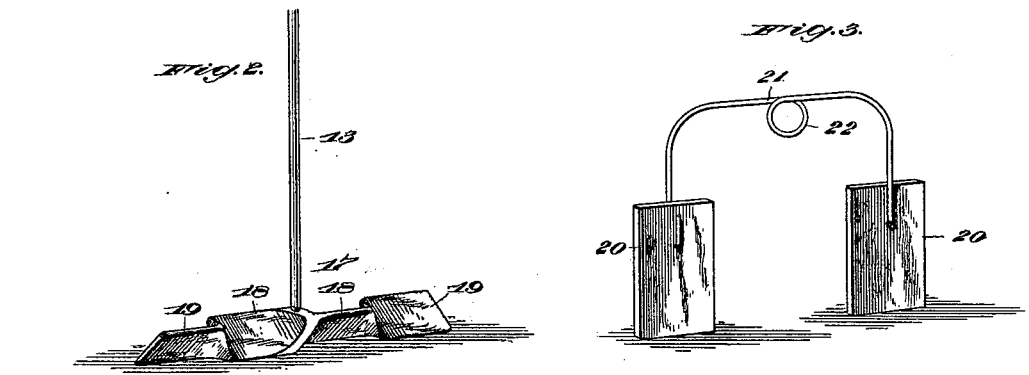

In the drawings, Figure 1 is a side view of a churn constructed in accordance with my invention, the churn-receptacle or jar being in section. Fig. 2 is a detail view in perspective of the dasher. Fig. 3 is a similar view of the breaker.

Similar numerals of reference indicate corresponding parts in all the figures of the drawings.

Rising from a base 1 of sufficient area to support a churn-receptacle 2 is a standard 3, suitably braced, as at 4, and carrying a supporting-arm 5, which extends over and parallel with the base. Upon a stub-shaft 6, projecting horizontally from the upright and held in place by a terminal nut 7, is a driving-pulley 8, preferably constructed of wood, with a suitable transverse cleat 9 extending diametrically of the face of the pulley and having a grip or handle 10 attached thereto contiguous to one end. This driving-pulley is traversed by a belt 11, which also extends around an axially-vertical pulley 12, secured to the dasher-shaft 13, said shaft being mounted in vertically-alined bearings 14 at the extremity of the horizontal supporting-arm. At intermediate points the driving-belt extends around direction-pulleys 15 and 16, having, respectively, vertical and horizontal axes, in order that the belt sides may be properly turned to traverse, respectively, the driving and driven pulleys.

Carried by the dasher-shaft is a dasher 17, having radially-disposed arms, each of which consists of oppositely-disposed inclined blades 18 and 19. The intermediate or inner blades 18 of the two arms are inclined in a common direction to deflect the contents of the churn-receptacle in the same direction during the rotation of the dasher, while the terminal blades 19 are inclined in the opposite direction to give an impulse in an opposite direction to the contents of the receptacle. In practice the rotation of the dasher is such as to cause the inner blades to deflect the liquid contents of the churn downwardly, and hence the outer or terminal blades, producing an opposite effect, will deflect the contents of the churn upwardly. The agitation thus produced causes the rapid separation of the butter globules from the milk and the efficient gathering thereof at the top of the liquid. It is necessary, however, in order to secure an efficient operation of the dasher, as above described, to employ a breaker for preventing the contents of the receptacle from receiving a rotatory movement, and the means which I have devised for accomplishing this object consists of duplicate breaker-blades 20, adapted for vertical disposition contiguous to the sides of the churn-receptacle above the plane of the dasher-arms, and a connecting-spring 21, terminally secured, respectively, to said breaker-blades and provided at an intermediate point with one or more coils 22 for giving an outward tendency to the blades. In practice this breaker device is arranged in the churn-receptacle by pressing the blades thereof toward each other, and upon releasing the same the tendency of the connecting-spring will be to force the outer edges of the blades into contact with the inner surface of the wall of the receptacle, and thus maintain the device at the desired adjustment. An advantage of this construction of breaker over those consisting of fixed slats arranged in the receptacle is that the device is applicable to a churn-receptacle of any ordinary construction, such as the ordinary stone jar, and in addition to this it is obvious that the breaker-blades may be arranged to extend inwardly a greater distance, and thus more materially interfere with the rotatory movement of the contents of the receptacle, yet provide for the removal with facility of the churn-dasher when the churning operation has been completed. Also should the breaker become displaced or should the blades of the dasher come in contact therewith no injury will result to either of the parts, from the fact that the breaker will simply receive a rotary motion with the dasher.

It will be understood that in practice various changes in the form, proportion, and the minor details of construction may be resorted to without departing from the spirit or sacrificing any of the advantages of this invention.

Having described my invention, what I claim is—

1. A churn-dasher having radially-disposed arms, each of which is provided with an upwardly-deflecting inner blade 18 inclined to a radial vertical plane in one direction, and a downwardly-deflecting outer blade 19 inclined to a radial vertical plane in the opposite direction, for deflecting the contents of a churn-receptacle respectively upward and downward in concentric columns at different distances from the axis of rotation, substantially as specified.

2. The herein-described breaker for churn-receptacles, consisting of separate blades arranged in a common plane, and a spring terminally attached respectively to said blades and provided with an intermediate coil, for resisting movement of the blades toward each other, and adapted to maintain the outer edges thereof in frictional contact with the inner surfaces of a churn-receptacle, substantially as specified.

In testimony that I claim the foregoing as my own I have hereto affixed my signature in the presence of two witnesses.

ORLANDO JAMES COLE.

Witnesses:
J. T. DRAKE,
B. L. PETTIT.